(12) United States Patent
Yamaguchi et al.

(10) Patent No.: US 7,942,767 B2
(45) Date of Patent: May 17, 2011

(54) BICYCLE DERAILLEUR WITH MULTIPLE MOUNTING ADJUSTMENTS

(75) Inventors: Souta Yamaguchi, Sakai (JP); Hideki Ikemoto, Sakai (JP)

(73) Assignee: Shimano, Inc., Sakai-ku, Sakai (JP)

( * ) Notice: Subject to any disclaimer, the term of this patent is extended or adjusted under 35 U.S.C. 154(b) by 27 days.

(21) Appl. No.: 11/959,890

(22) Filed: Dec. 19, 2007

(65) Prior Publication Data
US 2009/0163310 A1 Jun. 25, 2009

(51) Int. Cl.
*F16H 59/00* (2006.01)
(52) U.S. Cl. ............ 474/82; 474/70; 474/78; 474/80; 474/81; 474/102; 474/144; 74/469
(58) Field of Classification Search .......... 474/82, 474/80, 81, 78–79
See application file for complete search history.

(56) References Cited

U.S. PATENT DOCUMENTS

| | | | |
|---|---|---|---|
| 3,364,762 A | 1/1968 | Maeda | |
| 3,964,330 A * | 6/1976 | Ozaki | 474/80 |
| 4,235,118 A | 11/1980 | Huret | |
| 4,274,828 A * | 6/1981 | Huret | 474/82 |
| 4,286,953 A * | 9/1981 | Shimano | 474/80 |
| 4,690,663 A | 9/1987 | Nagano | |
| 5,498,211 A * | 3/1996 | Hsu | 474/80 |
| 5,931,753 A * | 8/1999 | Ichida | 474/82 |
| 6,287,228 B1 * | 9/2001 | Ichida | 474/82 |
| 7,066,856 B1 * | 6/2006 | Rogers | 474/144 |
| 2007/0202977 A1 | 8/2007 | Watarai et al. | |

FOREIGN PATENT DOCUMENTS

| | | |
|---|---|---|
| DE | 3235138 A1 | 5/1983 |
| DE | 60027797 T2 | 5/2007 |
| EP | 0020033 A2 | 5/1980 |
| GB | 2110322 A | 6/1983 |

OTHER PUBLICATIONS

Office action from the German Patent Office, for German patent application 10 2008 064 057.3-22, the German application that corresponds to this application, dated May 25, 2010.

* cited by examiner

*Primary Examiner* — Robert Siconolfi
*Assistant Examiner* — San Aung
(74) *Attorney, Agent, or Firm* — James A. Deland

(57) ABSTRACT

A bicycle derailleur comprises a base member; a movable member that supports a chain guide, wherein the movable member is coupled to the base member so that the movable member moves relative to the base member for moving a chain among a plurality of sprockets; an intermediate member that mounts the base member to a bicycle frame; a first adjusting mechanism that adjustably sets a position of the intermediate member relative to the bicycle frame; and a second adjusting mechanism that adjustably sets a position of the base member relative to the intermediate member.

20 Claims, 6 Drawing Sheets

BICYCLE DERAILLEUR WITH MULTIPLE MOUNTING ADJUSTMENTS

BACKGROUND OF THE INVENTION

The present invention is directed to bicycle derailleurs and, more particularly, to a bicycle derailleur with multiple mounting adjustments.

Typical bicycle rear derailleurs include a base member that mounts to the bicycle frame either directly or through an intermediate mounting member, a movable member coupled to the base member through a linkage mechanism so that the movable member moves laterally relative to the base member, and a chain guide mounted to the movable member. The chain guide typically includes a guide pulley and a tension pulley that engage the bicycle chain to guide the chain among a plurality of sprockets mounted to the rear wheel of the bicycle as the movable member moves relative to the base member.

Some derailleurs include an adjusting mechanism that allows the base member to be adjusted in a rotational direction relative to the bicycle frame. Such an adjustable derailleur is disclosed in U.S. Pat. No. 4,235,118. Other derailleurs, such as those disclosed in U.S. Pat. No. 4,690,663, include a base member that is rotatably mounted to the bicycle frame through a pivot shaft, wherein a torsion spring is mounted between the base member and a stopper plate that is rotatably mounted to the pivot shaft. The pivot shaft may be mounted either directly to the bicycle frame or indirectly through an intermediate member. An adjusting screw screws into a threaded opening in the stopper plate and contacts an abutment on the bicycle frame or on the intermediate member. Rotating the adjusting screw adjusts a twist angle of the torsion spring to adjust a biasing force applied between the stopper plate and the base member.

For optimum shifting, the distance between the guide pulley and the various sprockets, called "chain gap," should be made as small as possible. The derailleur disclosed in U.S. Pat. No. 4,690,663 provides a spring balancing mechanism to accomplish this goal. However, such a spring balancing mechanism cannot accommodate some of the more extreme frame configurations in some modern bicycles. For example, when the base member is coupled to the frame through an intermediate member, the intermediate member may be so large that the adjustment mechanism disclosed in the patent cannot fully accommodate the significantly increased chain gap caused by the intermediate member.

SUMMARY OF THE INVENTION

The present invention is directed to various features of a bicycle derailleur. In one embodiment, a bicycle derailleur comprises a base member; a movable member that supports a chain guide, wherein the movable member is coupled to the base member so that the movable member moves relative to the base member for moving a chain among a plurality of sprockets; an intermediate member that mounts the base member to a bicycle frame; a first adjusting mechanism that adjustably sets a position of the intermediate member relative to the bicycle frame; and a second adjusting mechanism that adjustably sets a position of the base member relative to the intermediate member. Additional inventive features will become apparent from the description below, and such features alone or in combination with the above features and their equivalents may form the basis of further inventions as recited in the claims.

DETAILED DESCRIPTION OF THE EMBODIMENTS

Figure 1:
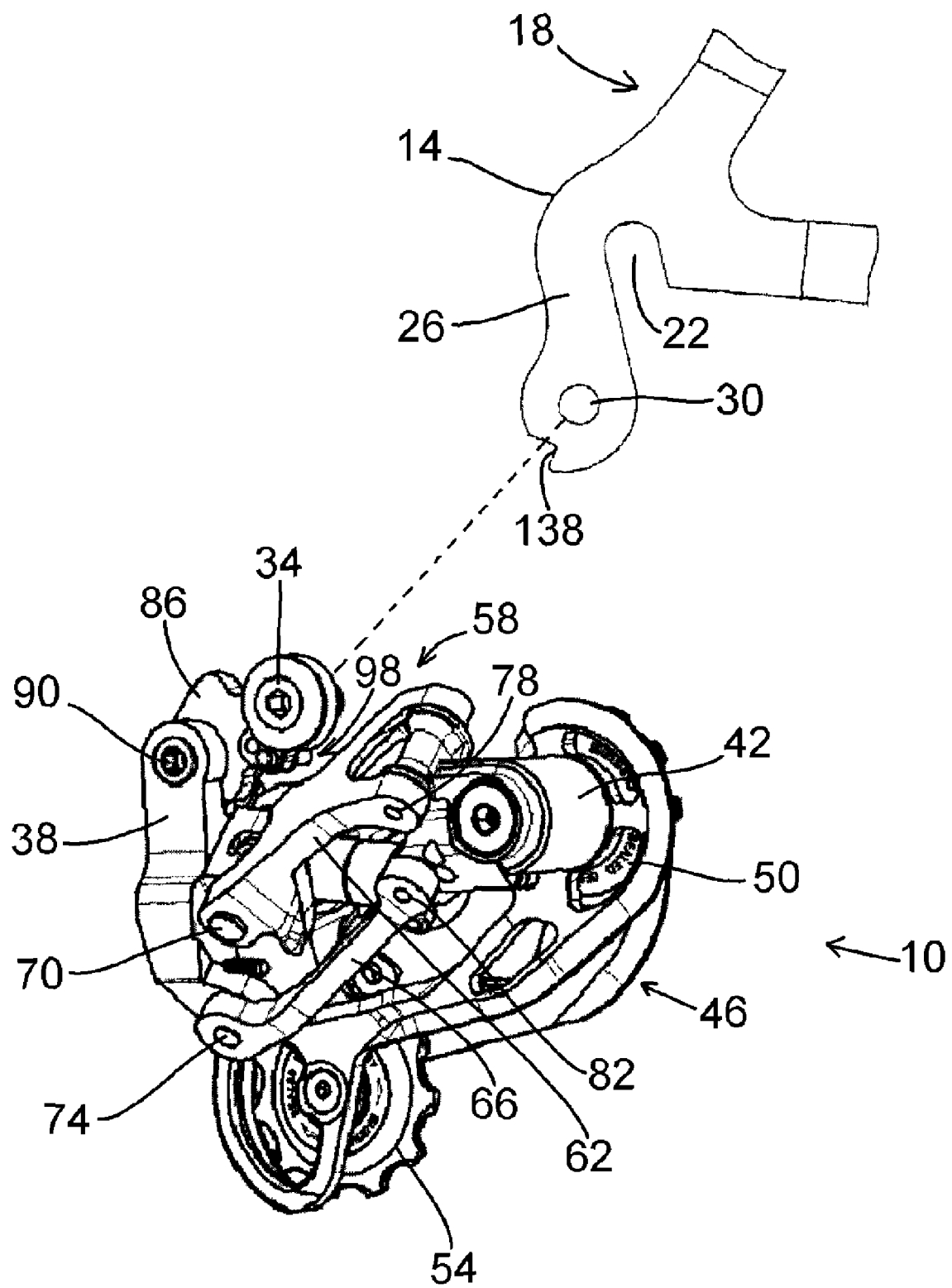
FIG. 1 is an outer side view of a bicycle rear derailleur that attaches to a bicycle frame.

FIG. 1 is a side view of a particular embodiment of a rear derailleur 10 that attaches to a rear dropout 14 of a bicycle frame 18. Rear dropout 14 includes a slotted opening 22 and an extension 26, wherein opening 22 is dimensioned for receiving the axle of a wheel hub (not shown) therein. Extension 26 includes a threaded opening 30 for receiving a derailleur mounting bolt 34 therein. In this embodiment, rear derailleur 10 may be constructed according to the teachings of U.S. Patent Application Publication No. 2007/0202977, published Aug. 30, 2007, incorporated herein by reference, with the modifications noted herein.

Figure 2:
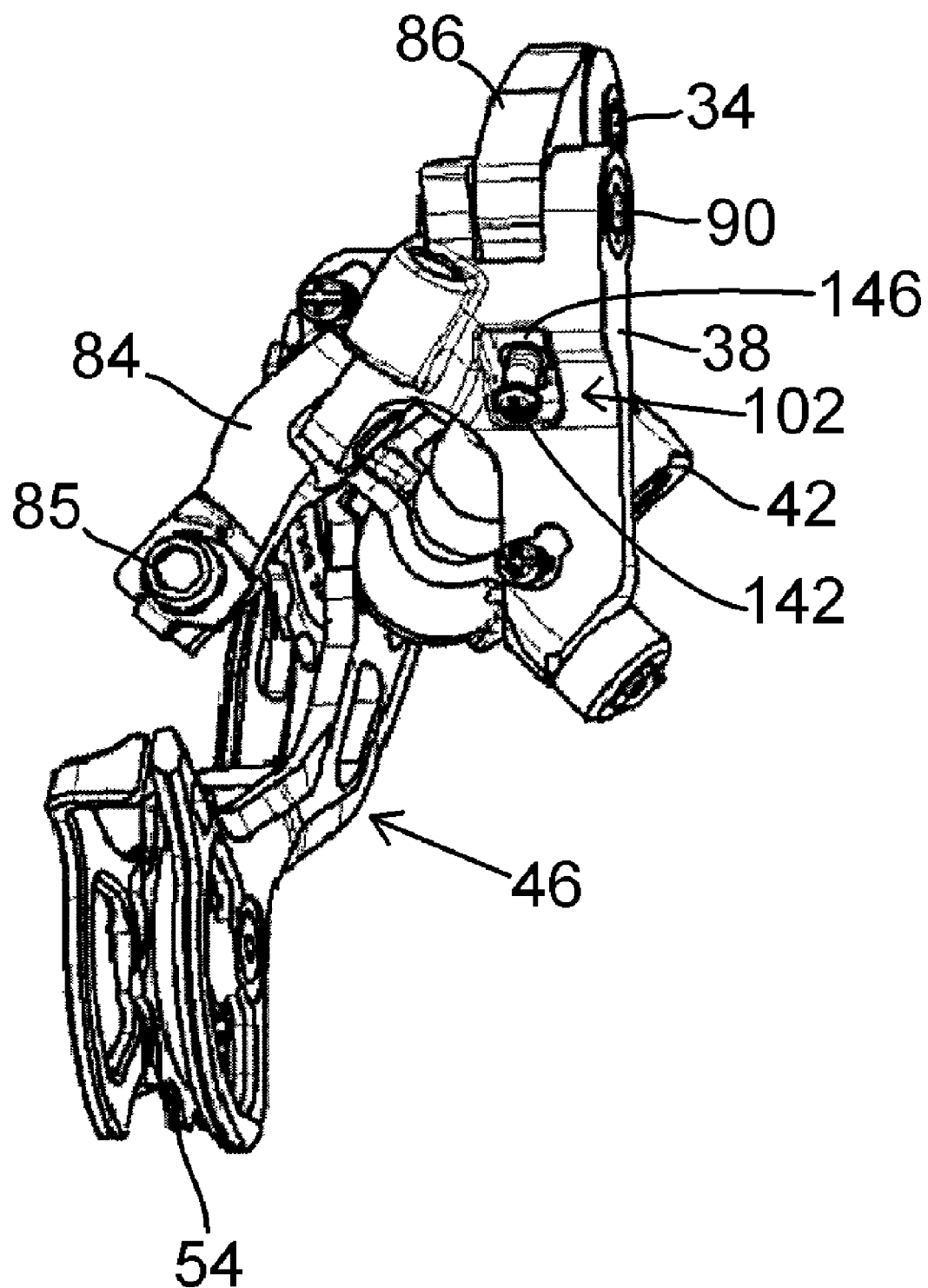
FIG. 2 is a rear view of the rear derailleur.
Figure 4:
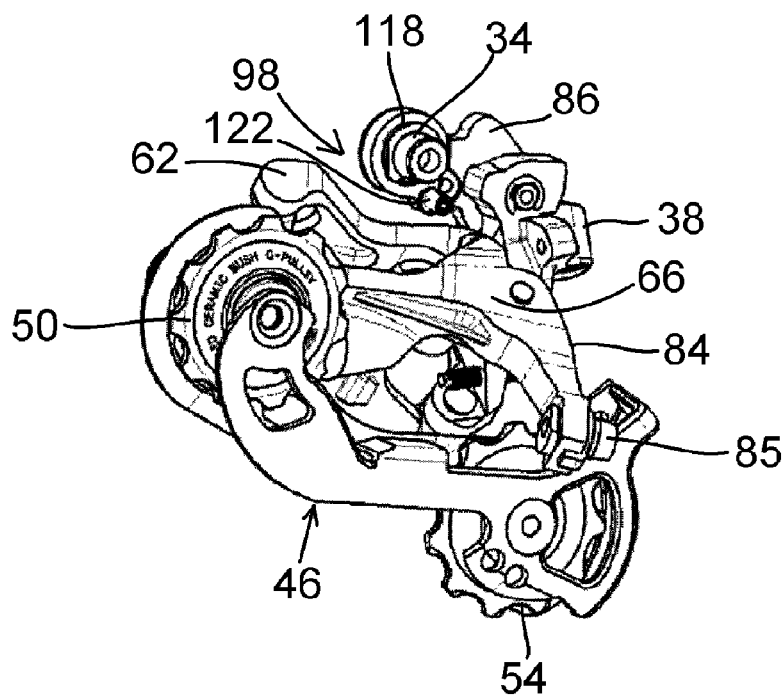
FIG. 4 is an inner side view of the rear derailleur.

In general, derailleur 10 includes a base member 38 and a movable member 42 that supports a chain guide 46, wherein chain guide 46 rotatably supports a guide pulley 50 and a tension pulley 54. Movable member 42 is coupled to base member 38 through a linkage mechanism 58 so that movable member 42 moves laterally relative to base member 38. Linkage mechanism 58 comprises link members 62 and 66, wherein link members 62 and 66 are pivotably mounted to base member 38 through pivot shafts 70 and 74, respectively, and link members 62 and 66 are pivotably mounted to movable member 42 through pivot shafts 78 and 82, respectively. An actuating arm 84 (FIGS. 2 and 4) with a cable attachment unit 85 is integrally formed with link member 66 for operating derailleur 10 in the known manner.

In this embodiment, base member 38 is mounted indirectly to bicycle frame 18 through an intermediate member 86. Base member 38 is rotatably mounted to intermediate member 86 through a base member shaft in the form of a base member mounting bolt 90 so that base member 38 pivots relative to intermediate member 86 around base member mounting bolt 90. Similarly, intermediate member 86 is rotatably mounted to extension 26 of rear dropout 14 through an intermediate member shaft formed by mounting bolt 34 so that intermediate member 86 pivots relative to rear dropout 14 around mounting bolt 34. A first adjusting mechanism 98 adjustably sets a rotational position of intermediate member 86 relative to bicycle frame 18, and a second adjusting mechanism 102 (FIGS. 2 and 3) adjustably sets a rotational position of base member 38 relative to intermediate member 86.

Figure 5:
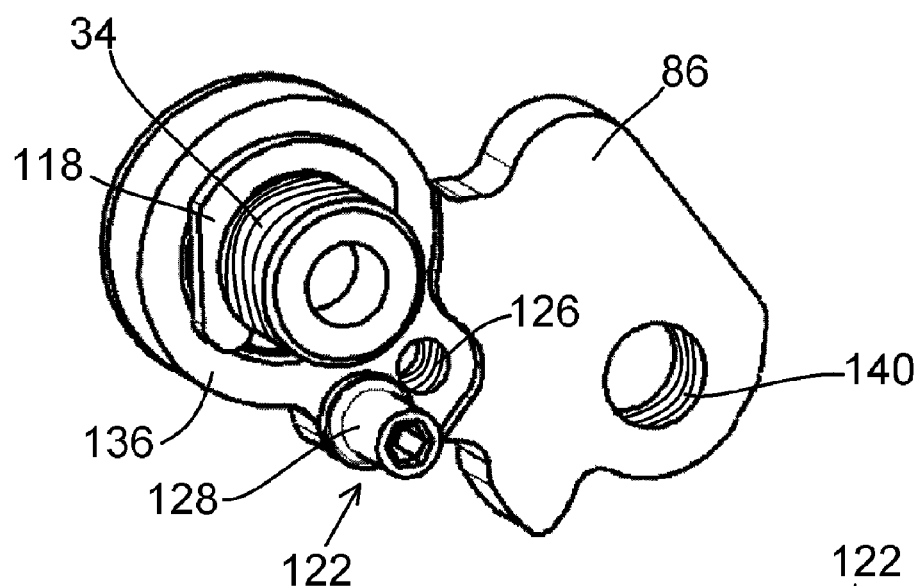
FIG. 5 is a more detailed view of inner side portions of the intermediate member and an adjusting mechanism for the rear derailleur.
Figure 7:
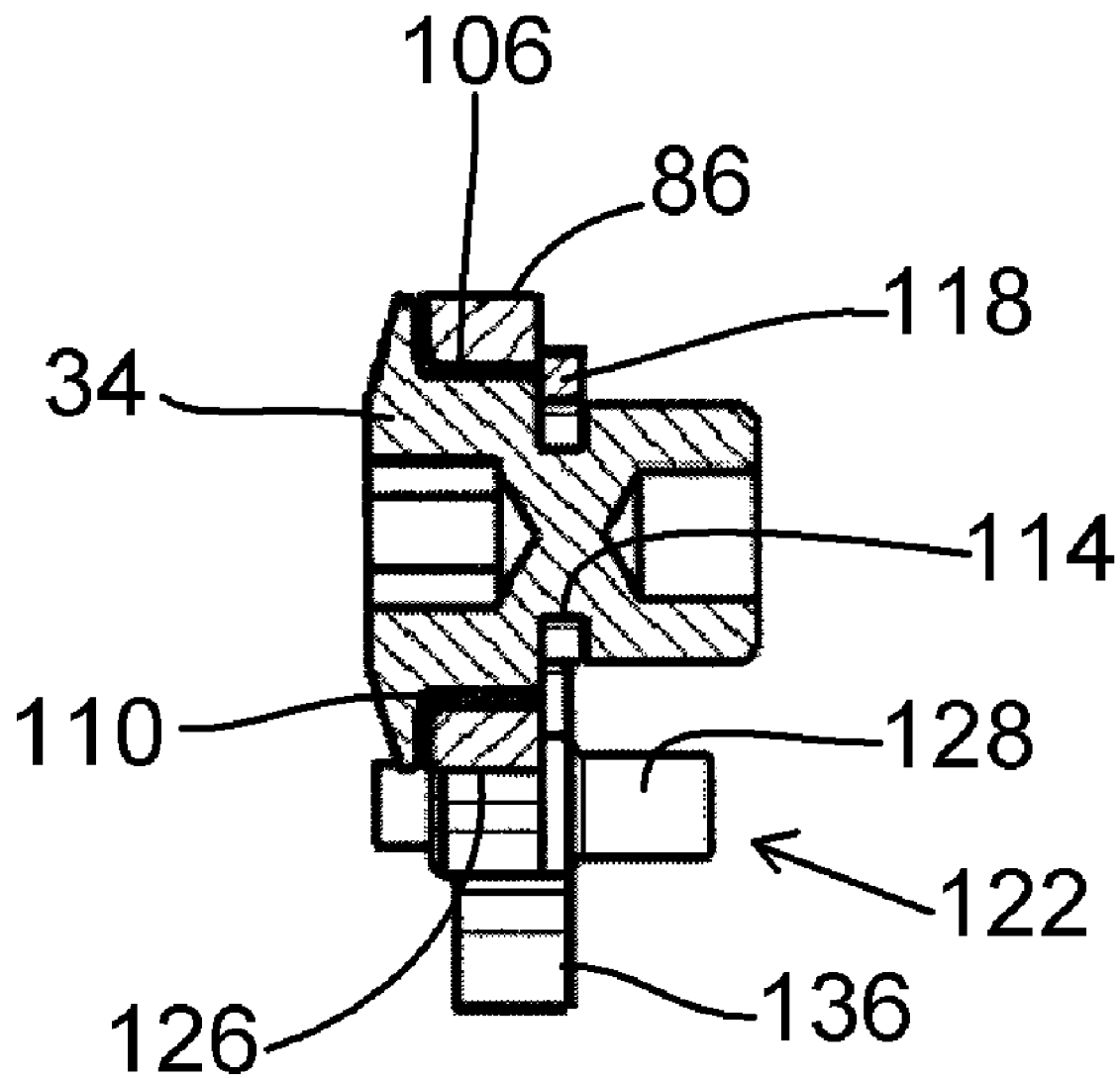
FIG. 7 is a view taken along line VII-VII in FIG. 5.

As shown more clearly in FIGS. 5 and 7, in this embodiment intermediate member 86 includes a derailleur mounting opening 106 in which is fitted a tubular bushing 110 dimensioned to receive mounting bolt 34 therethrough. Mounting bolt 34 includes a peripheral groove 114 in which is fitted a retaining ring 118. Retaining ring 118 retains mounting bolt 34 to intermediate member 86 and also forms a stopper so that mounting bolt 34 also functions as a pivot shaft so that intermediate member 86 can rotate around mounting bolt 34 when mounting bolt 34 is screwed into threaded opening 30 in rear dropout 14.

Figure 6:
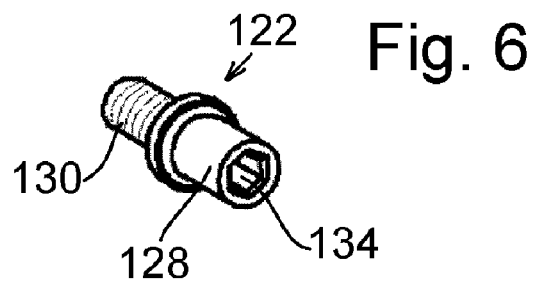
FIG. 6 is an oblique view of a particular embodiment of an abutment member.

In this embodiment, first adjusting mechanism 98 comprises an abutment member 122 and a plurality of (e.g., two) threaded openings 126 formed in intermediate member 86. As shown in FIG. 6, abutment member 122 comprises a shaft with a cylindrical abutment portion 128 and a threaded screw portion 130. A hexagonal tool-engaging opening 134 is formed in abutment portion 128 so that abutment member 122 may be screwed into a desired threaded opening 126 in intermediate member 86. When mounting bolt 34 is screwed into threaded opening 30 in extension 26 of rear dropout 14, abutment portion 128 of abutment member 122 extends laterally relative to a side surface 136 of intermediate member 86 and contacts a frame abutment 138 (FIG. 1) on extension 26 of rear dropout 14, thereby forming an abutment between intermediate member 86 and bicycle frame 18. As a result of this structure, first adjusting mechanism 98 can adjustably set a rotational position of intermediate member 86 relative to bicycle frame 18 in discrete steps.

Figure 3:
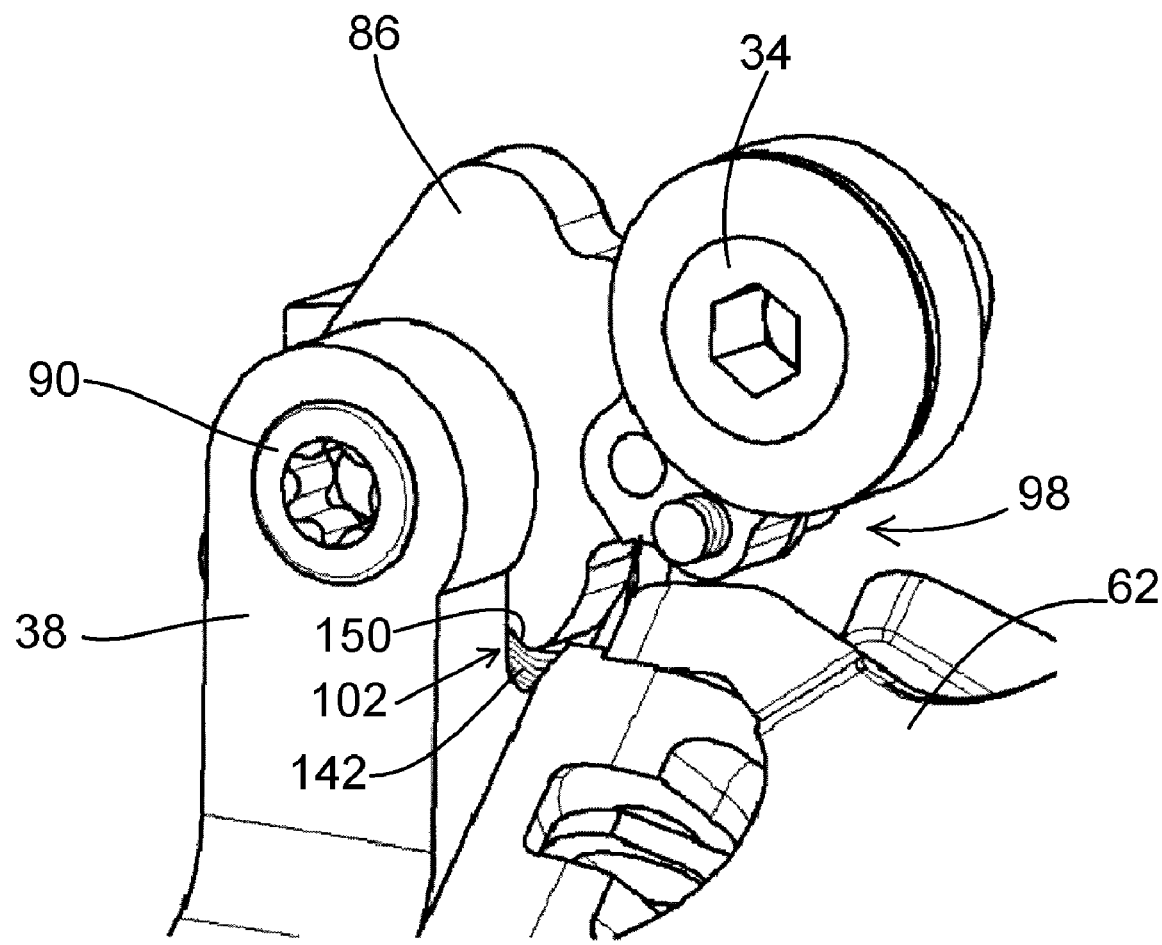
FIG. 3 is a more detailed view of outer side portions of the base member and the intermediate member of the rear derailleur.

In this embodiment, base member shaft 90 has a threaded portion (not shown) that screws into a threaded opening 140 (FIG. 5) formed in intermediate member 86, wherein base member 38 pivots relative to intermediate member 86 around base member mounting bolt 90 as noted above. Second adjusting mechanism 102 comprises a screw 142 (FIG. 2) disposed in a threaded opening 146 formed in base member 38. As shown in FIG. 3, the end of screw 142 contacts an abutment 150 formed on intermediate member 86 so that rotation of screw 142 adjustably sets the rotational position of base member 38 relative to intermediate member 86 in a continuous manner.

Figure 8:
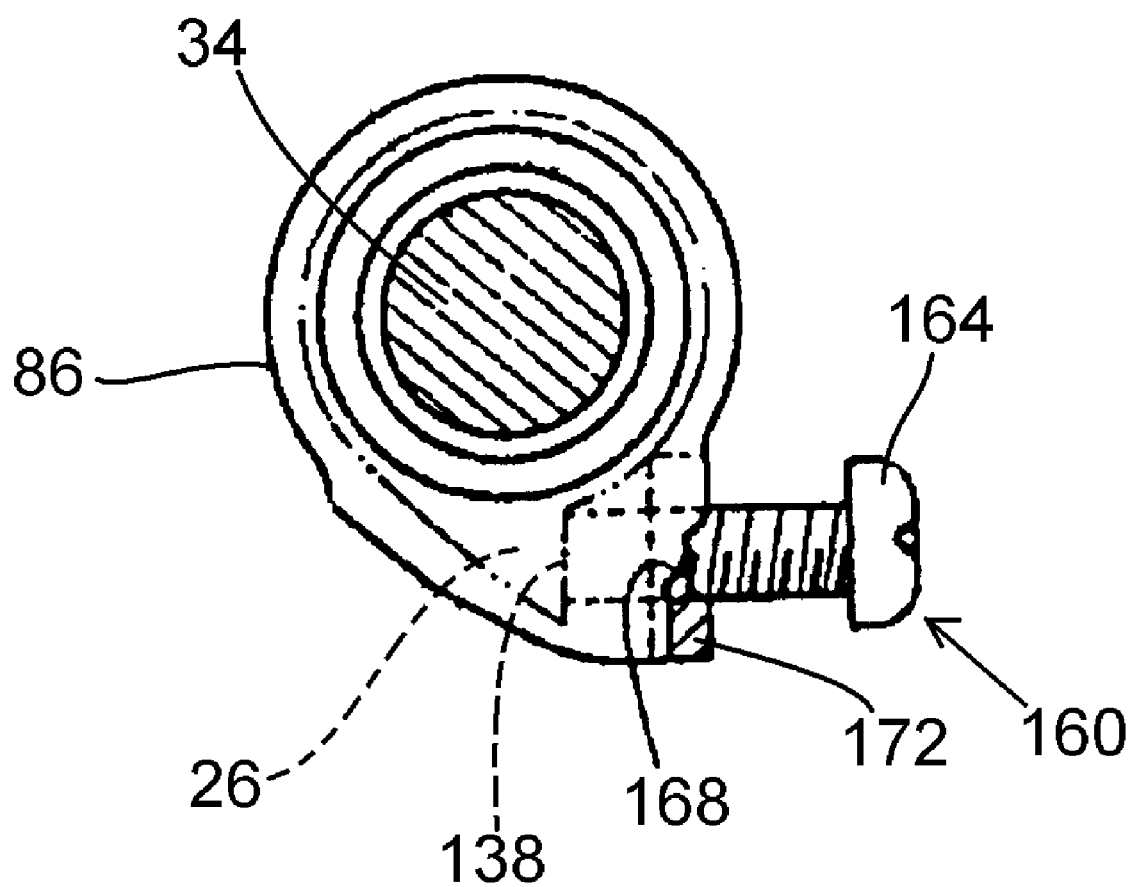
FIG. 8 is an inner side view of an alternative embodiment of an adjusting mechanism disposed between the intermediate member and the frame member.

While the above is a description of various embodiments of inventive features, further modifications may be employed without departing from the spirit and scope of the present invention. For example, while first adjusting mechanism 98 in the above-described embodiment adjustably sets the position of intermediate member 86 relative to bicycle frame 18 in discrete steps, FIG. 8 is an inner side view of an alternative embodiment of a first adjusting mechanism 160 that adjustably sets the position of intermediate member 86 relative to frame abutment 138 in a continuous manner. In this embodiment, a screw 164 engages a threaded opening 168 disposed in a flange 172 formed on intermediate member 86. The end of screw 164 contacts frame abutment 138 on extension 26 of rear dropout 14 so that rotation of screw 164 varies the rotational position of intermediate member 86 relative to bicycle frame 18.

While second adjusting mechanism 102 in the above-described embodiment adjustably sets the position of base member 38 relative to intermediate member 86 in a continuous manner, second adjusting mechanism 102 could be constructed to adjustably set the position of base member 38 relative to intermediate member 86 in discrete steps using the technique described above for first adjusting mechanism 98 or through other techniques. While screw 142 in second adjusting mechanism 102 was disposed in a threaded opening 146 disposed base member 38, screw 142 could be disposed in a threaded opening in intermediate member 86 to contact an abutment disposed on base member 38. The structures in first adjusting mechanism 98 could be interchanged as well.

In the prior art discussed previously, any adjustment of the position of the base member was limited to a linear arc centered around the derailleur mounting bolt. As a result of the teachings herein, first adjusting mechanism 98 and second adjusting mechanism 102 create an adjustment envelope in the form of a two-dimensional area. The conversion of the adjustment capability of the base member from a fixed line to a two-dimensional are greatly improves the ability to adjust the position of the base member, and hence the guide pulley, relative to the sprockets.

From the foregoing it should be readily apparent that the size, shape, location or orientation of the various components may be changed as desired. Components that are shown directly connected or contacting each other may have intermediate structures disposed between them. Separate components may be combined, and vice versa. The functions of one element may be performed by two, and vice versa. The function of one element may be performed by another, and functions may be interchanged among the elements. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Terms of degree such as "substantially," "about" and "approximately" as used herein include a reasonable amount of deviation of the modified term such that the end result is not significantly changed. For example, such terms may include a deviation of at least ±5% of the modified term as long as such a deviation would not negate the meaning of the word it modifies. Thus, the scope of the invention should not be limited by the specific structures disclosed or the apparent initial focus or emphasis on a particular structure or feature.

What is claimed is:

1. A bicycle derailleur comprising:
   a base member;
   a movable member that supports a chain guide, wherein the movable member is coupled to the base member so that the movable member moves relative to the base member for moving a chain among a plurality of sprockets;
   an intermediate member that mounts the base member to a bicycle frame;
   a first adjusting mechanism that adjustably sets a position of the intermediate member relative to the bicycle frame, wherein the first adjusting mechanism does not fasten the intermediate member to the bicycle frame; and
   a second adjusting mechanism that adjustably sets a position of the base member relative to the intermediate member;
   wherein the first adjusting mechanism causes the intermediate member to rotate around a first axis;
   wherein the second adjusting mechanism causes the base member to rotate around a second axis; and
   wherein the first axis is different from the second axis.

2. The derailleur according to claim 1 wherein the second adjusting mechanism adjustably sets the position of the base member relative to the intermediate member in a continuous manner.

3. The derailleur according to claim 2 wherein a screw is disposed in a threaded opening disposed on one of the base member or the intermediate member and contacts an abutment disposed on the other one of the base member or the intermediate member to adjustably set the position of the base member relative to the intermediate member.

4. The derailleur according to claim 3 wherein the base member is coupled to the intermediate member through a base member shaft, wherein the base member pivots relative to the intermediate member around the base member shaft.

5. The derailleur according to claim 4 wherein the second adjusting mechanism adjustably sets a rotational position of the base member relative to the intermediate member.

6. The derailleur according to claim 1 wherein the first adjusting mechanism sets the position of the intermediate member relative to the bicycle frame in discrete steps.

7. The derailleur according to claim 6 wherein the first adjusting mechanism comprises an abutment member that forms an abutment between the intermediate member and the bicycle frame.

8. The derailleur according to claim 7 wherein the abutment member extends laterally relative to a side surface of the intermediate member.

9. The derailleur according to claim 7 further comprising an intermediate member shaft that couples the intermediate member to the bicycle frame, wherein the intermediate member pivots relative to the bicycle frame around the intermediate member shaft.

10. The derailleur according to claim 9 wherein the first adjusting mechanism adjustably sets a rotational position of the intermediate member relative to the bicycle frame.

11. The derailleur according to claim 7 wherein the abutment member is attached to the intermediate member at selected ones of a plurality of locations on the abutment member or on the intermediate member.

12. The derailleur according to claim 11 wherein the intermediate member includes a plurality of openings, and wherein the abutment member is disposed in selected ones of the plurality of openings to set the position of the intermediate member relative to the bicycle frame.

13. The derailleur according to claim 12 wherein the abutment member comprises a shaft that is inserted into selected ones of the plurality of openings to set the position of the intermediate member relative to the bicycle frame.

14. The derailleur according to claim 13 wherein the plurality of openings comprise a plurality of threaded openings, and wherein the abutment member comprises a screw that is screwed into selected ones of the plurality of openings to set the position of the intermediate member relative to the bicycle frame.

15. The derailleur according to claim 14 further comprising an intermediate member shaft that couples the intermediate member to the bicycle frame, wherein the intermediate member pivots relative to the bicycle frame around the intermediate member shaft.

16. The derailleur according to claim 15 wherein the first adjusting mechanism adjustably sets a rotational position of the intermediate member relative to the bicycle frame member.

17. The derailleur according to claim 1 wherein the first adjusting mechanism adjustably sets the position of the intermediate member relative to the bicycle frame in a continuous manner.

18. The derailleur according to claim 17 wherein a screw is disposed in a threaded opening disposed on the intermediate member for contacting an abutment disposed on the bicycle frame to adjustably set the position of the intermediate member relative to the bicycle frame.

19. The derailleur according to claim 17 further comprising an intermediate member shaft that couples the intermediate member to the bicycle frame, wherein the intermediate member pivots relative to the bicycle frame around the intermediate member shaft.

20. The derailleur according to claim 19 wherein the first adjusting mechanism adjustably sets a rotational position of the intermediate member relative to the bicycle frame member.

* * * * *